(12) United States Patent
Garcia

(10) Patent No.: US 12,317,860 B2
(45) Date of Patent: Jun. 3, 2025

(54) PET GROOMING APPARATUS

(71) Applicant: Eduardo Garcia, Hialeah, FL (US)

(72) Inventor: Eduardo Garcia, Hialeah, FL (US)

( * ) Notice: Subject to any disclaimer, the term of this patent is extended or adjusted under 35 U.S.C. 154(b) by 28 days.

(21) Appl. No.: 18/310,671

(22) Filed: May 2, 2023

(65) Prior Publication Data

US 2024/0365749 A1    Nov. 7, 2024

(51) Int. Cl.
*A01K 13/00* (2006.01)
*A47K 3/00* (2006.01)

(52) U.S. Cl.
CPC ............ *A01K 13/001* (2013.01); *A47K 3/001* (2013.01)

(58) Field of Classification Search
CPC .......... A01K 3/001; A47K 1/12; A47K 3/001; A47K 3/03; A47K 3/12; A47K 3/14; A47K 3/162; A47K 4/00
See application file for complete search history.

(56) References Cited

U.S. PATENT DOCUMENTS

| | | | |
|---|---|---|---|
| 2,438,979 A * | 4/1948 | Short | A01K 13/001 119/676 |
| 4,150,445 A * | 4/1979 | Bailey | A61G 7/1003 4/615 |
| 4,549,502 A | 10/1985 | Namdari | |
| 5,193,487 A | 3/1993 | Vogel | |
| 5,269,260 A | 12/1993 | Farrell et al. | |
| 5,367,724 A * | 11/1994 | Coccagna | A47K 3/12 4/573.1 |
| 5,682,626 A * | 11/1997 | Banks, Jr. | A47K 3/122 4/579 |
| 5,974,601 A | 11/1999 | Drane et al. | |
| 6,073,944 A * | 6/2000 | Moore | B62B 1/125 280/655.1 |
| 6,101,642 A | 8/2000 | Auten et al. | |
| 6,553,943 B1 | 4/2003 | Murphy | |
| 6,688,615 B2 * | 2/2004 | Chen | B62B 5/085 280/47.35 |
| 6,925,964 B2 | 8/2005 | Jeffery | |
| 6,935,276 B2 | 8/2005 | Powers | |
| 8,186,308 B1 | 5/2012 | Hluben et al. | |
| 8,607,741 B2 | 12/2013 | Perry et al. | |
| 8,757,097 B1 | 6/2014 | Autumn | |
| 9,248,065 B1 * | 2/2016 | Tu | A61G 7/1046 |
| 9,877,464 B2 | 1/2018 | Simons | |
| 10,952,408 B1 | 3/2021 | Frost | |
| D1,004,308 S * | 11/2023 | Duarte | D6/336 |
| 2005/0005875 A1 | 1/2005 | Suggs | |
| 2005/0247588 A1* | 11/2005 | Hedges | B25H 3/06 206/373 |

(Continued)

*Primary Examiner* — Christopher D Hutchens
*Assistant Examiner* — Nevena Aleksic
(74) *Attorney, Agent, or Firm* — Malloy & Malloy, PL; Victor Bruzos

(57) ABSTRACT

A pet grooming kit for converting a bathtub into a pet grooming station. The pet grooming kit includes an apparatus for establishing a raised platform in the bathtub. The pet grooming kit further includes a wheeled bench that is independently movably relative to the apparatus between a separate seated condition and a dolly condition engaging the apparatus for the combination to be wheeled away for storage. The pet grooming kit may include a vertical pole elevated above the raised platform for restraining a pet thereon, wherein the apparatus is circumscribed by the bathtub.

1 Claim, 7 Drawing Sheets

(56) References Cited

U.S. PATENT DOCUMENTS

| | | | |
|---|---|---|---|
| 2007/0079766 A1* | 4/2007 | Park | A61D 11/00 |
| | | | 119/674 |
| 2008/0100015 A1* | 5/2008 | Symiczek | B66F 7/28 |
| | | | 280/79.4 |
| 2011/0297103 A1 | 12/2011 | Iou | |
| 2012/0086180 A1* | 4/2012 | Fakhoorian | B62B 5/0093 |
| | | | 280/79.11 |
| 2016/0338321 A1* | 11/2016 | Simons | A01K 15/04 |

* cited by examiner

PET GROOMING APPARATUS

CROSS-REFERENCE TO RELATED APPLICATION

This application claims the benefit of priority of U.S. provisional application No. 63/421,405, filed 1 Nov. 2022, the contents of which are herein incorporated by reference.

BACKGROUND OF THE INVENTION

The present invention relates to pet grooming and more particularly, to a pet grooming apparatus and kit for forming a grooming station from a pre-exiting bathtub.

Domesticate pets can bring immeasurable joy to their owners' life, but eventually the pet needs to be bathed. Most dogs/pets do not like the idea of jumping into a tub, and so tend to escape the tub the first chance they get. Pets can be veritable escape artists when they do not like a location.

As a result, bathing one's pet can be troublesome when done at home. The carrying of the pet and the repeated bending over required by the owner when bathing a pet in a bathtub can result in back pain, while the anxiety of the pet can ruin the bathroom with scratches in addition to leaving a wet sudsy mess in the tub and surrounding floor. And the bathing process almost always ends with a clogged drain.

Groomers can be expensive for just bathing dirty smelly pets. Grooming trucks take all day and are also expensive and can be very inconsistent and at times difficult to book at the last minute. Also, for an owner of a handicapped or injured pet, there can be understandable trepidation using third parties for an activity that requires compassion.

A need exists for a pet grooming apparatus and kit for forming a grooming station from a pre-exiting bathtub.

SUMMARY OF THE INVENTION

The present invention is an all-in-one, simple, affordable pet grooming kit that anyone can assemble in minutes in their own tub, in effect converting the tub into a professional grooming station, wherein the pet grooming kit can be broken down, wheeled away on its dolly wheel, and efficiently stored. The present invention thereby obviates clogged drains and scratched tubs. The present invention is dimensioned and shaped to eliminate the need to perform back breaking work of carrying the pet to the tub and washing a pet therein.

The present invention, colloquially known as "Gypsy Pet Tub Station", is a unique kit not found anywhere else, wherein the kit is adapted to assemble in any standard tub, allowing compassionate restraint of the pet and a comfortable sitting stool for the user. The kit enables a mobile configuration wherein the apparatus and sitting stool engage for easy dolly transport and storage.

The present invention embodies an innovative method for utilizing a bathtub to wash-dry and groom a pet, converting the bathtub into a professional groomer's station by being installed therein. The present invention could also be used to cut nails, administer medication, clean teeth/ears, and brush one's pet at eye level with the animal, making it less stressful for the owner as well as for the pet in all the above-mentioned activities.

In one aspect of the present invention, a system for converting a bathtub into a pet grooming stations, the system includes the following: an apparatus for selectively elevating a platform confined by the bathtub; and a bench having wheels, wherein the bench is dimensioned and shaped to be independently movable between a seat condition spaced apart from the apparatus and a dolly condition engaging the apparatus so that said wheels carry the apparatus.

In another aspect of the present invention, the system for converting a bathtub into a pet grooming station includes the following: an extendable pole supportable over the platform in a parallel orientation thereto; a vertical upright connected to each end of the extendable pole, wherein the apparatus has a framework providing arms and legs for engaging an inner surface of the bathtub, wherein the legs are oriented perpendicular relative to the arms, wherein the legs and arms terminate in suction cups, wherein the legs and arms are telescopically associated with the suction cups, wherein the bench defines a cavity circumscribed by a plurality of sidewalls, wherein a first sidewall of the plurality of sidewalls is shaped to accommodate a human user in a seated position thereon, and wherein a second sidewall of the plurality of sidewalls, opposite the first sidewall, provides one or more protruding elements for balancing, in concert with the wheels, the first sidewall during the seated position, wherein the wheels are positioned along a third sidewall of the plurality of sidewalls, wherein the third sidewall interconnects the first and second sidewalls, and wherein the framework engages the one or more protruding elements for facilitating the dolly condition.

These and other features, aspects and advantages of the present invention will become better understood with reference to the following drawings, description, and claims.

DETAILED DESCRIPTION OF THE INVENTION

Figure 1:
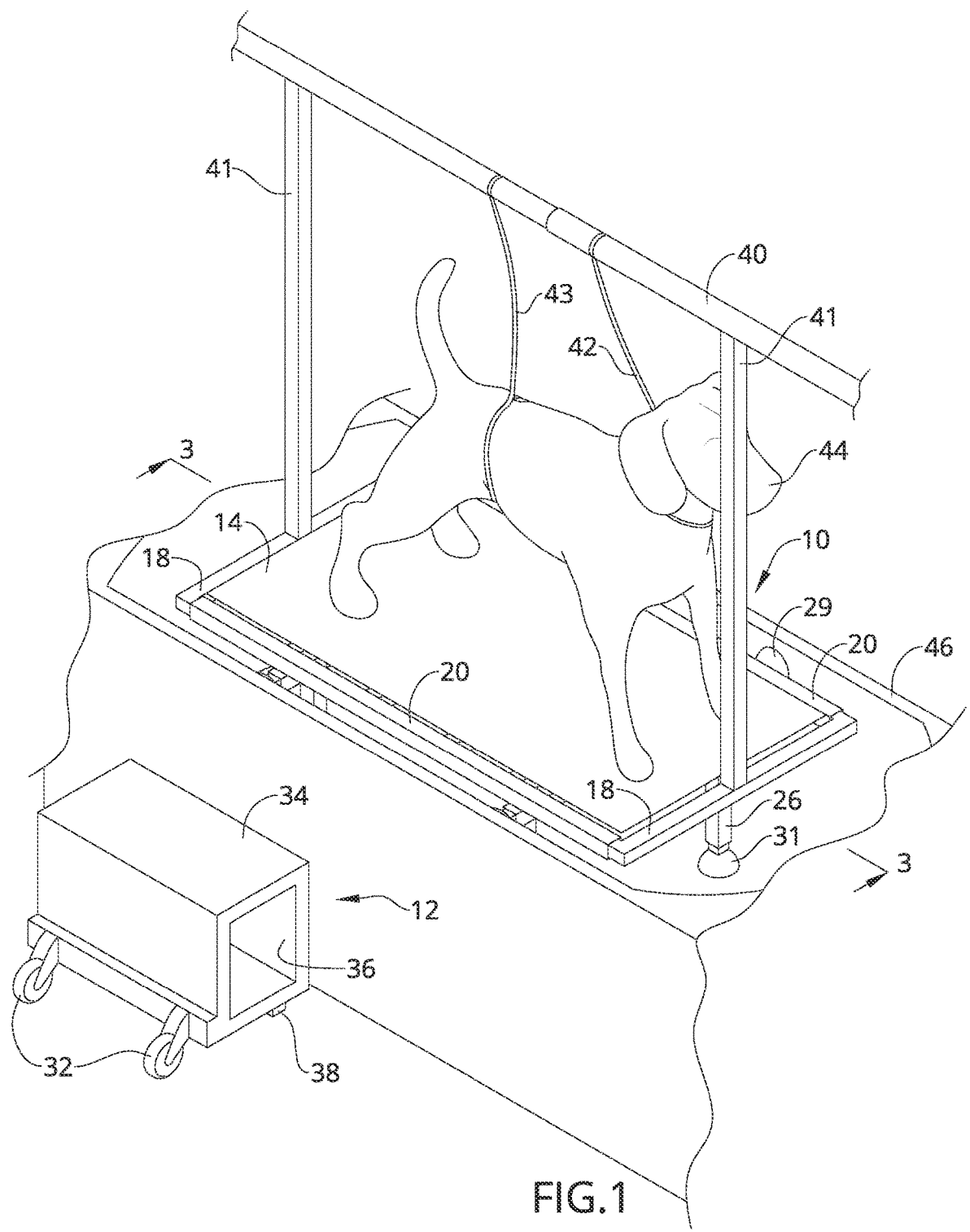
FIG. 1 is a perspective view of an exemplary embodiment of the present invention, shown in use.
Figure 2:
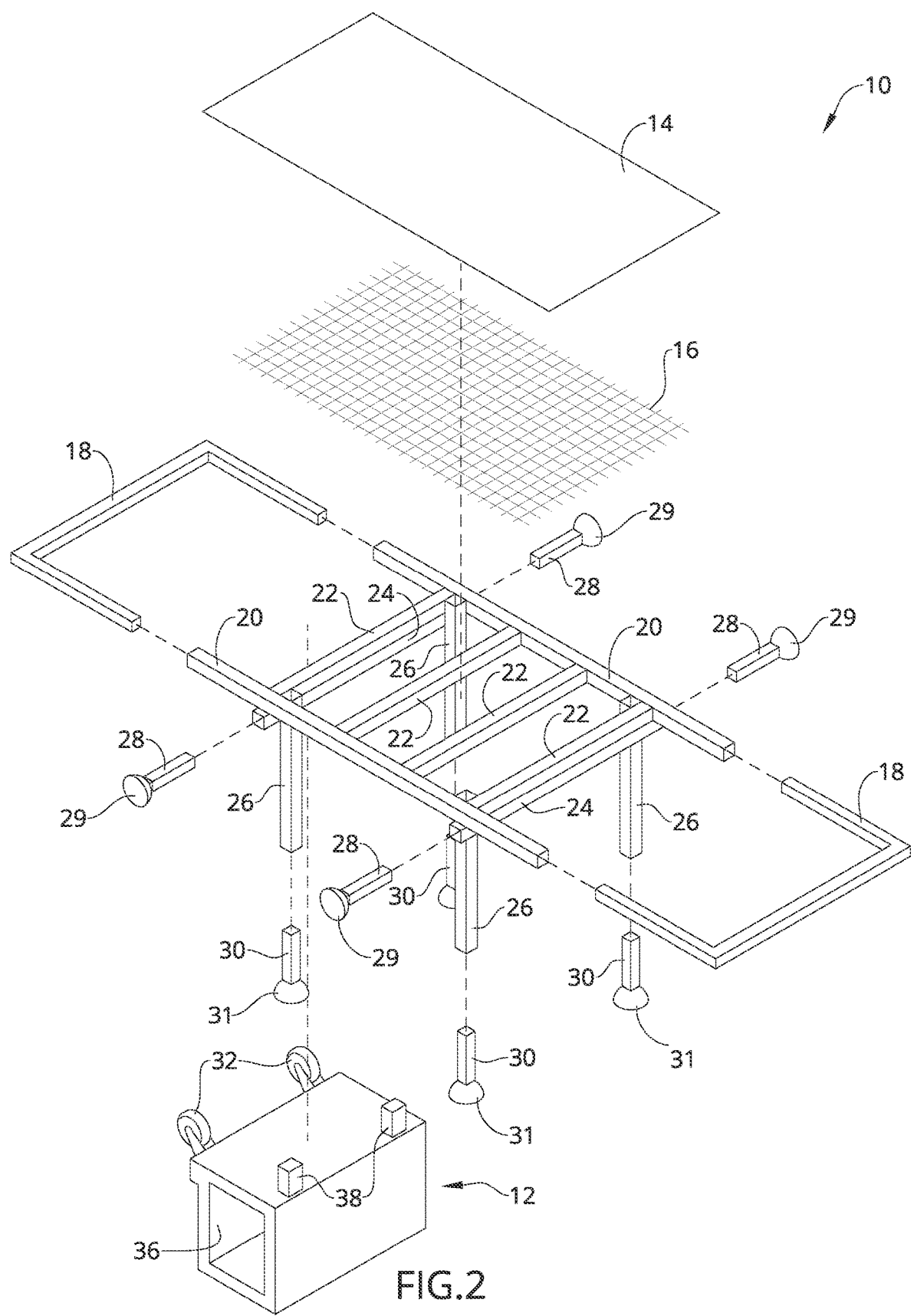
FIG. 2 is an exploded perspective view of an exemplary embodiment of the present invention.
Figure 3:
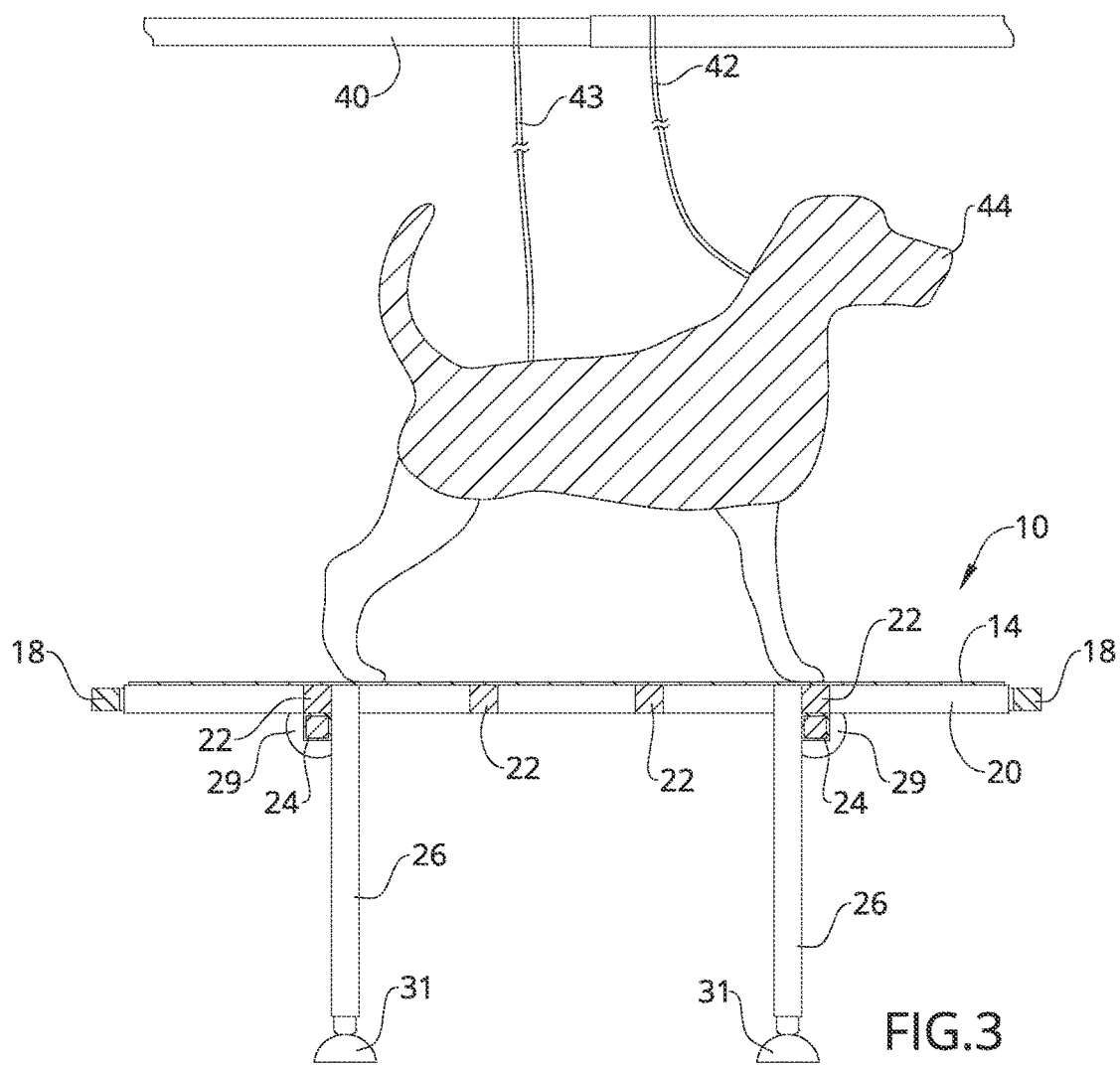
FIG. 3 is a section view of an exemplary embodiment of the present invention, taken along line 3-3 in FIG. 1.
Figure 4:
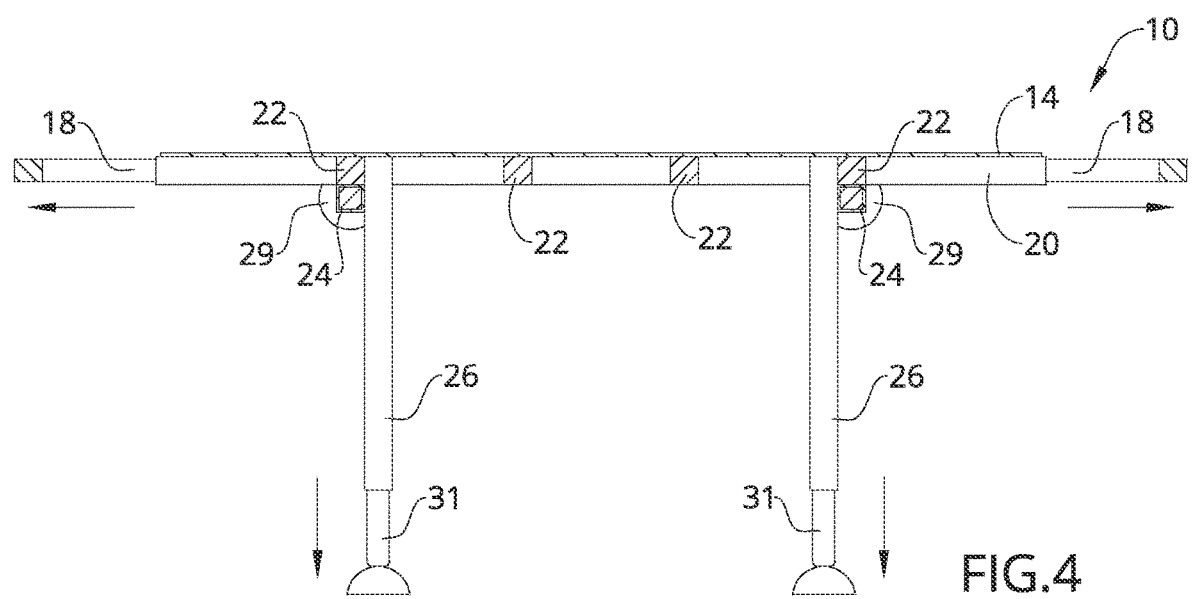
FIG. 4 is the section view of FIG. 3, illustrating telescopic movement of the vertical leg and lateral arms.
Figure 5:
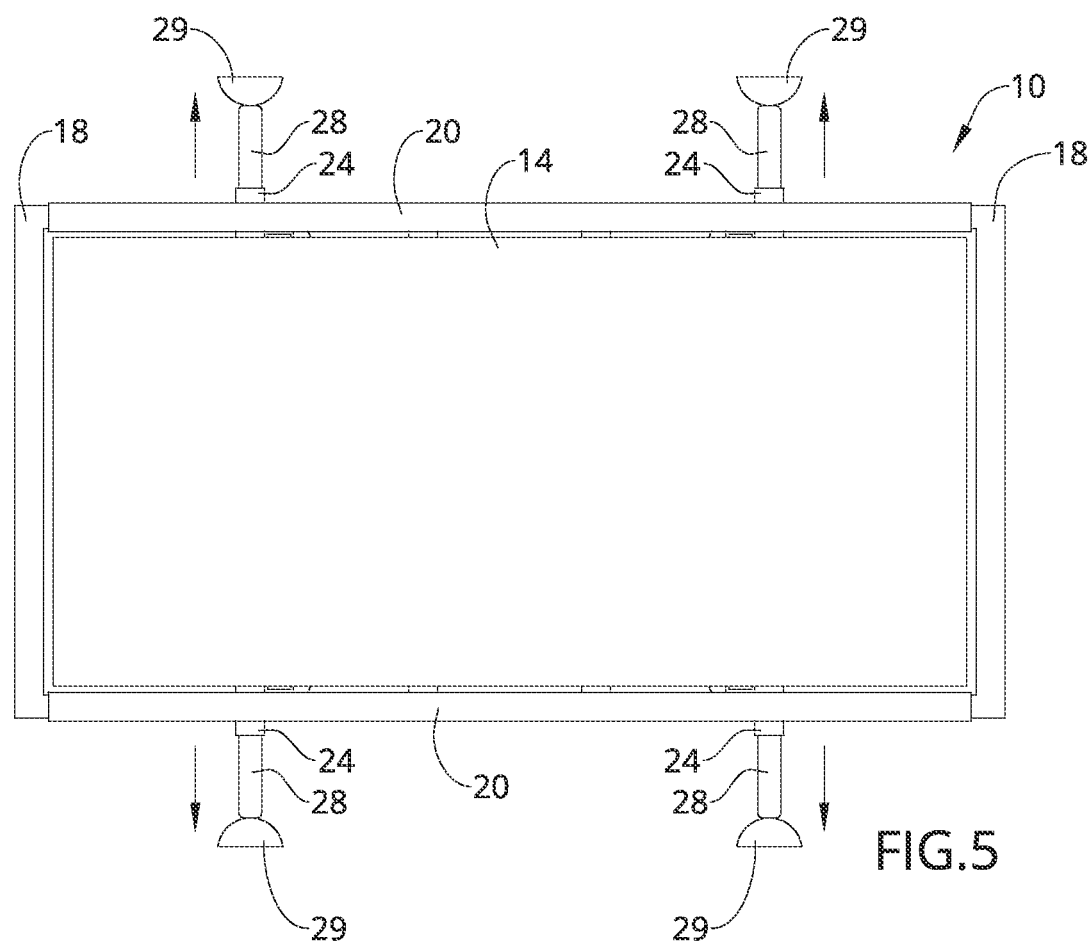
FIG. 5 is a top plan view of an exemplary embodiment of the present invention, illustrating the telescopic movement of the lateral leg.
Figure 6:
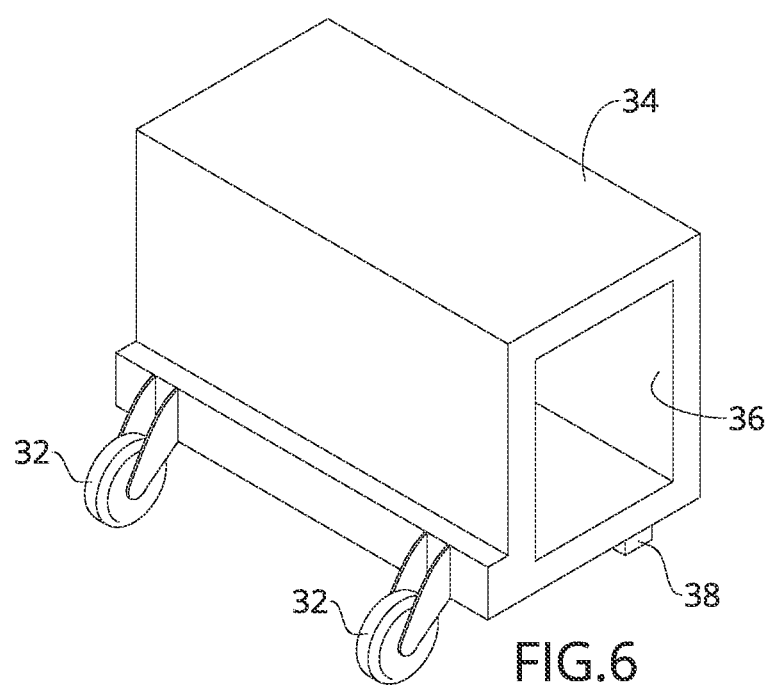
FIG. 6 is a perspective view of an exemplary embodiment of a bench 12 of the present invention.
Figure 7:
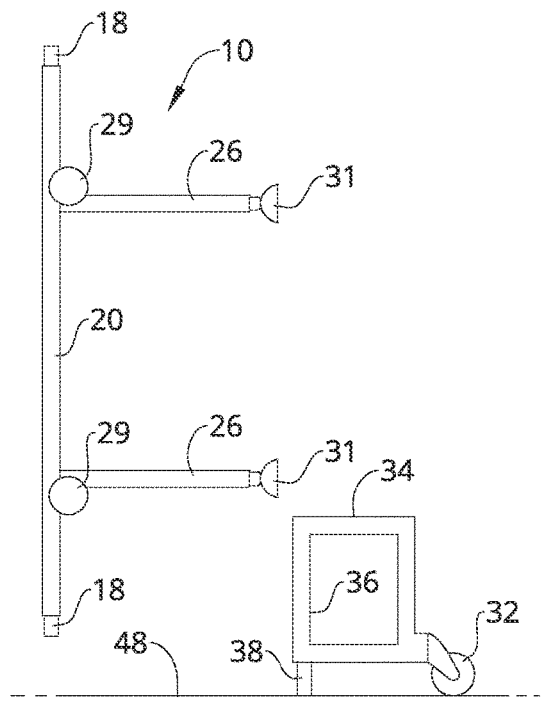
FIG. 7 is a side elevation view of an exemplary embodiment of the present invention, illustrating the bench detached from the pet grooming apparatus in a vertical orientation.
Figure 8:
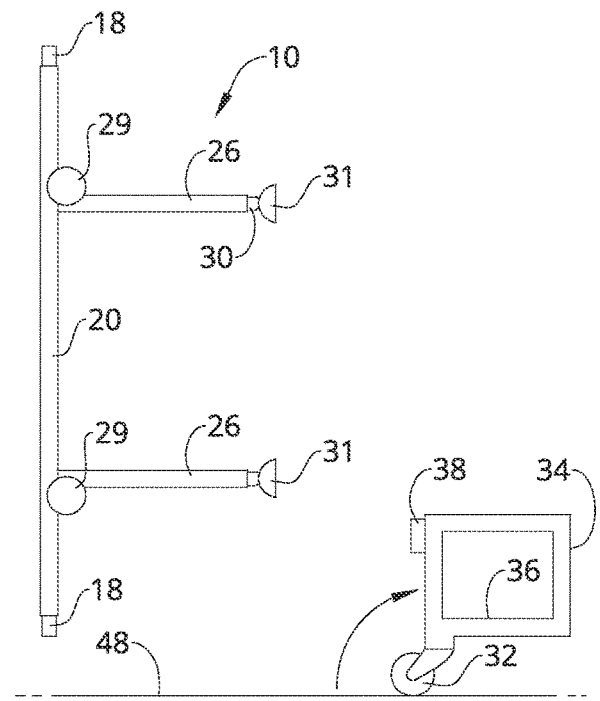
FIG. 8 is a side elevation view of an exemplary embodiment of the present invention, illustrating independent movement of the bench relative to the vertically oriented pet grooming apparatus.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a pet grooming kit for converting a bathtub into a pet grooming station. The pet grooming kit includes an apparatus for establishing a raised platform in the bathtub. The pet grooming kit further includes a wheeled bench that is independently movably relative to the apparatus between a separate seated condition and a dolly condition engaging the apparatus for the combination to be wheeled away for storage. The pet grooming kit may include a vertical pole elevated above the raised platform for restraining a pet thereon, wherein the apparatus is circumscribed by the bathtub.

Referring to FIGS. 1 through 13, the present invention may include a pet grooming apparatus 10 for installation in a bathtub 46 thereby establishing a raised platform 14 therein. The pet grooming apparatus 10 includes a bench 12 the moves between a detached seat condition and an attached dolly condition operatively associated with the pet grooming apparatus 10.

The pet grooming apparatus 10 may include a framework providing two U-end members 18, two side members 20 that interconnect respective ends of the two U-shaped end members 18, and cross members 22 spanning the two side members 20. The framework supports the platform 14 in the horizontal orientation illustrated in FIG. 1. Between the platform 14 and the framework may be a mesh or grid plate 16. It is understood that different arrangements, shapes, and material types of members (or possibly one foldable member) may be used if it functions as disclosed herein.

The framework may support at least two lateral members 24 extending laterally across the framework in a spaced apart arrangement. From each end of each lateral member 24, a lateral arm 28 may be telescopically associated therewith. At the distal end of each arm 28 is an engagement device 29, such as a suction cup or the like. It is understood that the side members 20 shown in the illustrations extend in a longitudinal direction.

The framework may support a plurality of vertical members 26 extending perpendicularly from a plane of the framework defined by the lateral and longitudinal directions. The plurality of vertical members 26 may be connected in a spaced apart arrangement along the framework. From each end of each vertical member 26, a leg 30 may be telescopically associated therewith. At the distal end of each leg 30 is an engagement device 31.

The present invention includes the bench 12 which may be tubular and rectangular, though it is understood other shapes and forms are contemplated herein as long as the bench 12 functions as disclosed herein. The bench 12 has a plurality of sidewalls that define a cavity 36, 52 dimensioned and shaped to removably store paraphernalia of pet grooming. A first sidewall 34, 50 may be dimensioned and shaped for accommodating a seated user. Along a second bottom sidewall, opposite the first sidewall 34, 50 may be one or more protruding element 38, 54. Along a lateral sidewall (connecting the top and bottom sidewalls) may be bench wheels 32 that protrude beyond the lateral and bottom walls so that in concert with the protruding element 38, 54 the bench wheels 32 can support, on a supporting surface 48, the seated user on the first sidewall 34, 50; though, by pivoting the bottom wall off the supporting surface 48 the bench 12 can be wheeled around the supporting surface 48 by just the bench wheels 32.

Figure 9:
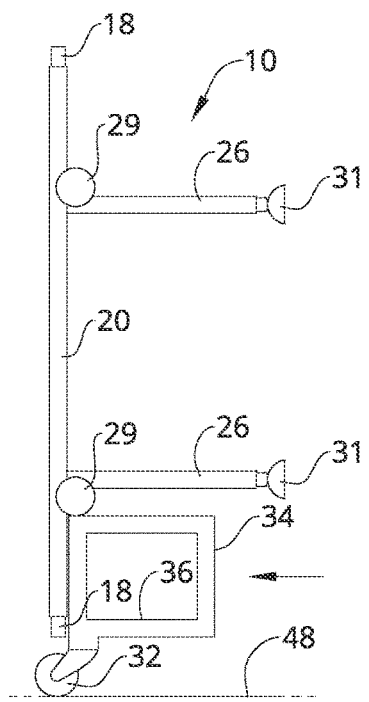
FIG. 9 is a side elevation view of an exemplary embodiment of the present invention, illustrating formation of a mobile configuration of the bench and pet grooming apparatus.
Figure 10:
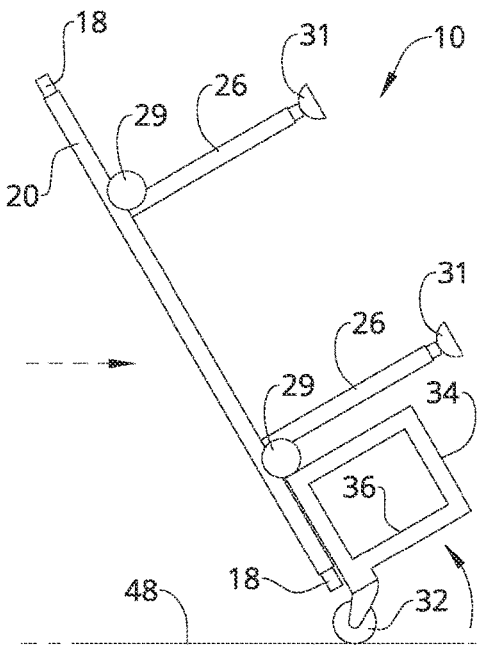
FIG. 10 is a side elevation view of an exemplary embodiment of the present invention, illustrating dolly movement in the mobile configuration.
Figure 11:
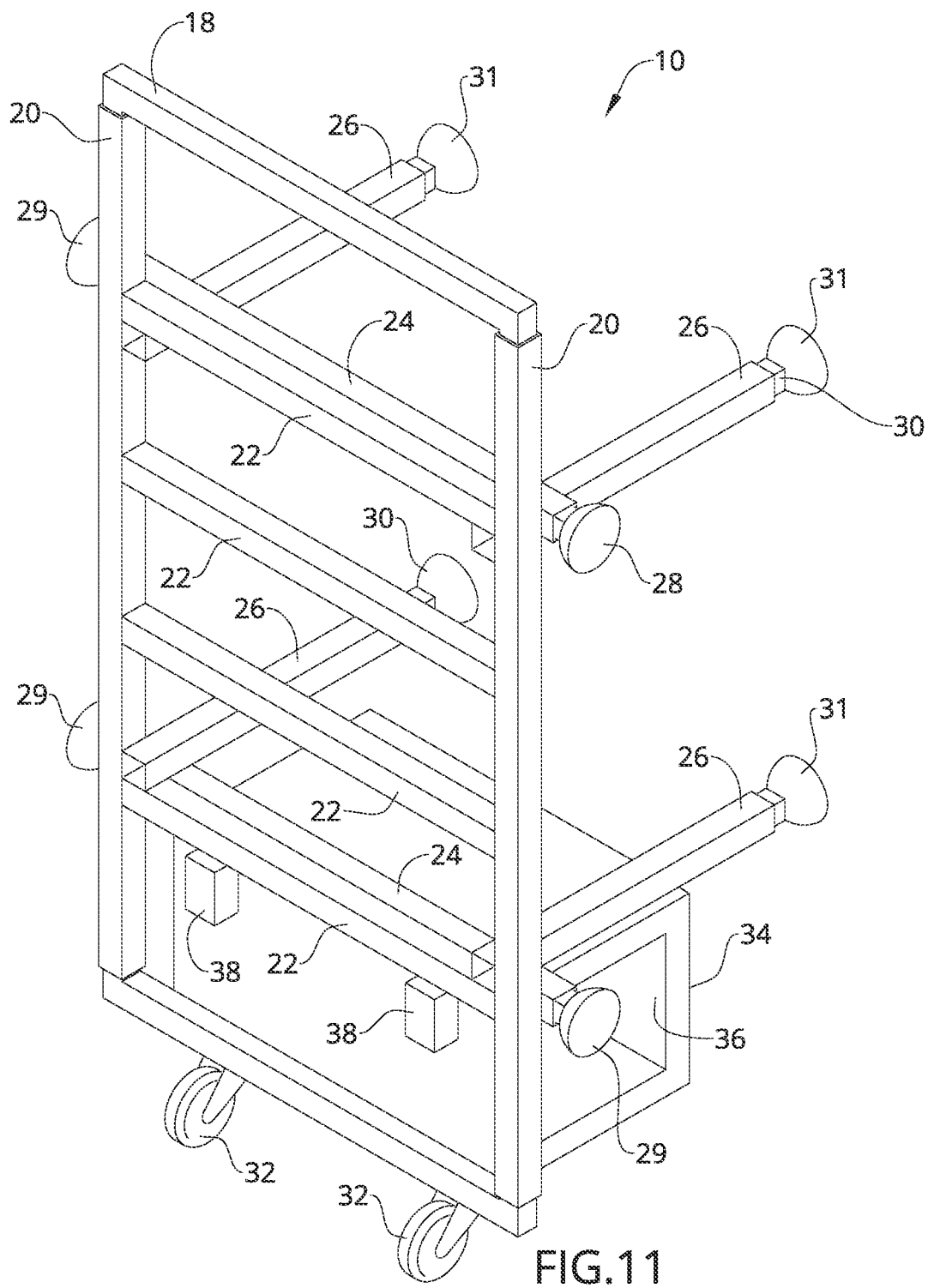
FIG. 11 is a perspective view of an exemplary embodiment of the present invention in the mobile configuration.
Figure 12:
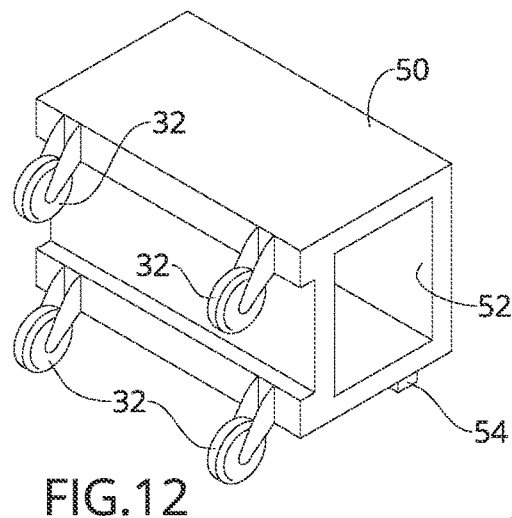
FIG. 12 is a perspective view of an exemplary embodiment of a bench 12 of the present invention.
Figure 13:
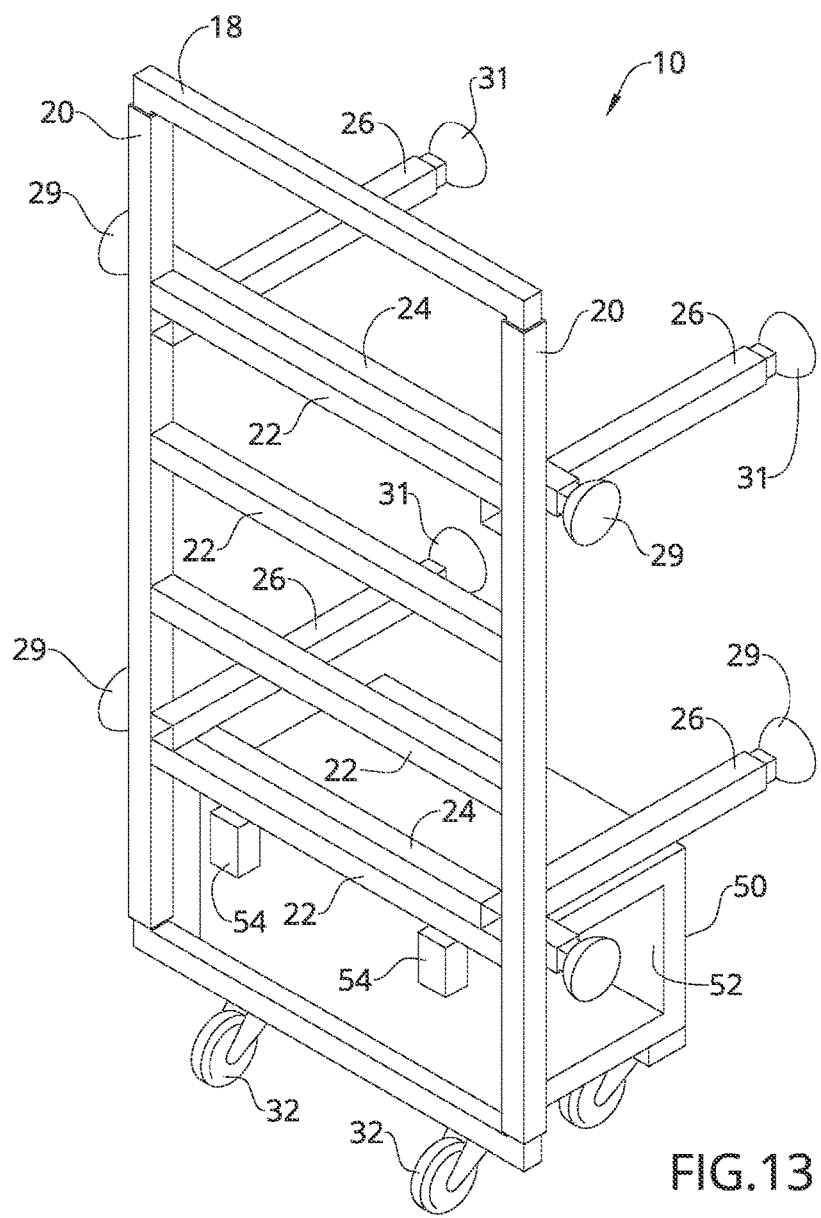
FIG. 13 is a perspective view of an alternative exemplary embodiment of the present invention in the mobile configuration.

Referring to FIGS. 9 and 10, when a portion of the framework and one lateral member 24 engages the bench 12 in a mobile condition, the apparatus 10 can be wheeled around in a dolly condition. In one embodiment, a distal end of the framework (e.g., a U-shaped end member 18) may be seated on the protruding element 38, 54 of the bench 12, while a surface of the one lateral member 24 is seated on the lateral sidewall opposite the bench wheels 32.

The present invention contemplates a kit that incorporates the pet grooming apparatus 10, the bench 12, and an extendable pole 40. The pole 40 may extend in a horizontal orientation, parallel with the bathtub 46, spaced vertically above the bathtub 46 by several feet. A user would place the extension pole 40 over the tub 46 at a distance dictated by the pet's size. The extension pole 40 may be supported on each end by vertical uprights 41.

The pet grooming apparatus 10 may be installed in the bathtub 46 by communicating the lateral engagement devices 29 with the inner sidewalls of the bathtub 46 after communicating the vertical engagement device 31 to the bottom surface of the bathtub 46 as shown in the Figures so that the platform 14 is approximately or substantially parallel with an upper surface of the bathtub 46. It should be noted that because of the telescopic nature of the legs 30, the platform 14 can be selectively set at different elevations relative the upper surface of the bathtub 46 to make it as convenient as possible for the user of the present invention. Along those lines, the bench 12 can be propped in the seated condition, shown in FIGS. 1, 6 and 7 so that the user may be seated thereon. The pet 44 may have one or two leashes 42, 43 connected to the extendable pole 40 while the user in the seated condition grooms the pet 44. When done, the user may uninstall the pet grooming apparatus 10 from the tub 46 so that the pet grooming apparatus 10 can form the mobile configuration with the bench 12 for transport to a storage condition.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the present invention.

What is claimed is:

1. A system for converting a bathtub disposed between two end walls into a pet grooming station, the system comprising:

an apparatus for selectively elevating a platform relative to the bathtub and selective attachment to a bench for conversion into a dolly condition, the apparatus comprising a framework comprising a plurality of cross members and at least two end members;

said framework configured and dimensioned to support at least two lateral members, at least four vertical members, a mesh, the platform, and vertical uprights;

said mesh oriented between said platform and said plurality of cross members;

each of said at least two lateral members comprising at least two arms, configured and dimensioned in nestled relation to and telescopically associated with a lateral member;

each of said at least four vertical members comprising at least one leg, configured and dimensioned in nestled relation to and telescopically associated with a vertical member;

said vertical uprights configured and dimensioned to support an extendable pole;

said at least two arms of each of said at least two lateral members configured and dimensioned to engage two opposing sidewalls of the bathtub, forming at least four engagement points with the sidewalls of the bathtub to stabilize the framework therebetween;

said at least one leg of each of said at least four vertical members configured and dimensioned to engage a bottom surface of the bathtub and selectively raise the platform at different elevations relative to an upper surface of the bathtub;

said at least two arms of each of said at least two lateral members and said at least one leg of each of said at least four vertical members terminating at suction cups;

said extendable pole elevated by said vertical uprights above the upper surface of the bathtub and configured and dimensioned to engage the two end walls, diametrically opposed to one another to stabilize the apparatus;

a bench comprising at least four sidewalls;

a first of said at least four sidewalls of said bench configured and dimensioned to accommodate a human user in a seated position thereon;

a second of said at least four sidewalls of said bench, opposite said first of said at least four sidewalls of said bench, comprising a protruding element;

a third of said at least four sidewalls of said bench comprising wheels; and a fourth of said at least four sidewalls of said bench additionally configured and dimensioned to receive at least one of said at least two lateral members and said protruding element configured and dimensioned to receive at least one of said end members to allow said apparatus to selectively attach to said bench to convert said apparatus to a dolly condition.

* * * * *